United States Patent [19]
Fluharty et al.

[11] Patent Number: 5,743,675
[45] Date of Patent: Apr. 28, 1998

[54] UNDERGROUND CABLE ANODE INSTALLMENT SYSTEM

[75] Inventors: Herbert L. Fluharty; Scot P. Fluharty; John W. Fluharty, II, all of Mt. Pleasant, Mich.; Daniel P. Werner, Missouri City, Tex.

[73] Assignee: Mears/CPG, Inc., Rosebush, Mich.

[21] Appl. No.: 701,090

[22] Filed: Aug. 21, 1996

Related U.S. Application Data

[63] Continuation of Ser. No. 285,415, Aug. 3, 1994.

[51] Int. Cl.⁶ ............... F16L 1/00; H02G 9/00
[52] U.S. Cl. .................... 405/180; 405/183
[58] Field of Search .................. 405/154, 159, 405/174, 175, 179, 180, 181, 183, 184

[56] References Cited

U.S. PATENT DOCUMENTS

| | | | |
|---|---|---|---|
| 3,429,134 | 2/1969 | Coffey | 405/179 |
| 3,616,354 | 10/1971 | Russell et al. | 204/147 |
| 3,648,282 | 3/1972 | Kelly | 405/175 X |
| 3,684,030 | 8/1972 | Lucero | 405/180 X |
| 3,777,500 | 12/1973 | Kelly | 405/180 |
| 3,813,888 | 6/1974 | Purviance | 405/180 |
| 3,874,182 | 4/1975 | Potter et al. | 405/179 |
| 4,397,585 | 8/1983 | Fouss et al. | 405/180 |
| 4,400,259 | 8/1983 | Schutt | 204/196 |
| 4,437,789 | 3/1984 | Kasiewicz | 405/174 X |
| 4,442,903 | 4/1984 | Schutt et al. | 166/385 |
| 4,481,474 | 11/1984 | Gerrit | 324/425 |
| 4,812,078 | 3/1989 | Rivard | 405/174 X |
| 5,176,025 | 1/1993 | Butts | 73/405 |
| 5,185,921 | 2/1993 | Pfaller et al. | 29/825 |

Primary Examiner—Frank Tsay
Attorney, Agent, or Firm—Arnold, White & Durkee

[57] ABSTRACT

An anode cable installment system in which the apparatus may comprise a plow for creating a tunnel; a conduit for delivering a linear anode to the tunnel; and a chute disposed proximate the conduit, the chute having a non-metallic inner surface, preferably an epoxy film layer having a lower coefficient of friction than steel. The coke breeze may be delivered to the tunnel by passing it over the non-metallic inner surface of the chute; and to the annular space in the tunnel around the linear anode to provide a horizontal encasement or column for the linear anode with reduced void spaces and increased density.

17 Claims, 3 Drawing Sheets

UNDERGROUND CABLE ANODE INSTALLMENT SYSTEM

This application is a continuation of application Ser. No. 08/285,415 filed Aug. 3, 1994.

BACKGROUND OF THE INVENTION

A. Field of the Invention

This invention relates generally to continuous cathodic protection of underground metal structures. In particular, the invention relates to an improved apparatus and method for installing underground, horizontally disposed continuous linear anodes.

B. Related Art

As used herein, the term "linear anodes" refers to continuous cathodic protection anodes, including both "cable," "ribbon" and "tubular" anodes. Linear anodes are often buried next to underground metal structures such as pipelines or storage tanks to protect them from corrosion. The anodes provide protection to the metal structures by raising the electric potential of the surrounding earth. A direct current is generally applied through the anode and into the earth at a sufficient potential to give the structure a negative voltage with respect to the anode and to protect the metal surface of the structure. The anode is often encased or surrounded with a carbon material such as coke breeze to enhance the passage of impressed current from the anode to the buried structure. The linear anodes are typically flexible and are considered "continuous" in that they are elongated and tubular, and are capable of being disposed alongside the buried structure.

A variety of systems may be used to install linear anodes. One of those systems is similar to that shown in FIG. 1 in which cable anodes are installed in the ground by creating a horizontal tunnel or linear ground opening with a plow blade affixed to a tractor. The anodes are installed down into the tunnel after it is dug by passing the anode down through a vertical conduit that is also connected to the tractor and directing the cable to lay down into the tunnel in a horizontal position. While the cable is being laid, coke breeze may be simultaneously delivered to the tunnel to fill the annular space around the cable. The coke breeze is delivered to the tunnel through a chute, which has a rectangular cross-section and which is disposed around the cable conduit. After the coke breeze and anode enter the tunnel created by the plow blade, the displaced earth falls back into place, resulting in a buried horizontal, densely-packed column of coke breeze encased around the linear anode.

Those systems, however, have been found to experience various shortcomings, particularly when the tunnel is dug at depths greater than three feet and more particularly at depths greater than six feet. It has been discovered that installment of the linear anode may be slowed because the coke breeze is not delivered to the tunnel quickly enough. Simply increasing the rate at which the cable is delivered through the conduit and into the tunnel has not solved the problem and has even created additional problems. If the linear anode is delivered too quickly, then insufficient coke breeze may be delivered to the annular space surrounding the linear anode. If the coke breeze is delivered too slowly, the coke breeze column may have a reduced density and void spaces or air pockets in the column. Low density and void spaces have been found to lower the overall performance and life of the anode, since current tends to be discharged directly off the anode rather than off the coke breeze column.

Accordingly, the present invention is believed to overcome one or more of those shortcomings. Many difficulties with installing coke breeze in an efficient manner arise at least in part from the nature of the coke breeze granular particles. As the individual coke breeze particles passing through the chute, they collide with the inside walls of the chute, generating friction which in turn slows down the overall rate of coke breeze delivery. Thus, the present invention may improve the effectiveness of a linear anode installment system, speed up delivery of the coke breeze and, correspondingly, speed up delivery of the cable anode. Another object of the invention is to maintain the desired density in the underground coke breeze column.

SUMMARY OF INVENTION

This invention relates generally to an apparatus and method for installing an underground linear anode, preferably one that is horizontal and encased in a granular cathodic material such as coke breeze proximate a cathodic metal structure such as a pipeline. The linear anode may be encased in a column comprising the cathodic particles upon installment. The anode may also be encased in the column prior to installment, having, for example, a nylon covering to hold the column in place around the anode. In a preferred aspect, the invention is directed to an improved coke breeze delivery subassembly for linear anode installment system.

In a specific embodiment, the apparatus comprises a plow for creating a substantially horizontal tunnel and a chute or other member having two ends and a conduit for delivering coke breeze to the tunnel to provide a horizontal column surrounding or encasing the linear anode. The chute has a smooth non-metallic inner surface, to reduce the friction that exists between the individual coke breeze particles and the inside wall of the chute. In the case of an encased cable anode, the smooth non-metallic surface may reduce friction between the outer covering and the inside wall of the chute. When the outer covering is a nylon layer or membrane, the smooth surface also helps prevent tearing of the nylon outer covering when the encased linear anode is delivered into the tunnel at high speeds. The apparatus may also include an anode conduit for delivering the linear anode to the tunnel. Preferably, the chute is made of a durable material such as steel, with a non-metallic inner lining. The lining should have a smooth surface and a lower coefficient of friction than steel to reduce the friction between the inner wall of the chute and the granular coke breeze. In a preferred aspect, the non-metallic lining comprises an epoxy film layer.

In another specific embodiment, the invention comprises an improved system for installing coke breeze particles in a tunnel to form a substantially horizontal, densely packed column encasing a buried linear anode. The system may comprise a subassembly including a chute with non-metallic inner surface. The chute may be metallic with a thin film non-metallic lining such as an epoxy film. Preferably, the chute has a cross section sufficiently large to receive the coke breeze particles, a first opening configured to receive the coke breeze particles and a second opening configured to deliver the coke breeze particles to the tunnel.

The method of this invention generally includes the steps of plowing the ground at a preselected depth to provide a substantially horizontal tunnel; delivering the linear anode to the tunnel and delivering coke breeze or other cathodic material to the annular space in the tunnel around the linear anode to provide an encasement for the linear anode. In that method, the coke breeze is delivered by passing it over a non-metallic surface having a lower coefficient of friction than steel. Preferably, the coke breeze is delivered by passing it over a chute inner liner which comprises an epoxy film. The coke breeze may comprise loose particles or a densely packed column encasing a cable anode.

DETAILED DESCRIPTION AND PREFERRED EMBODIMENTS

Figure 1:
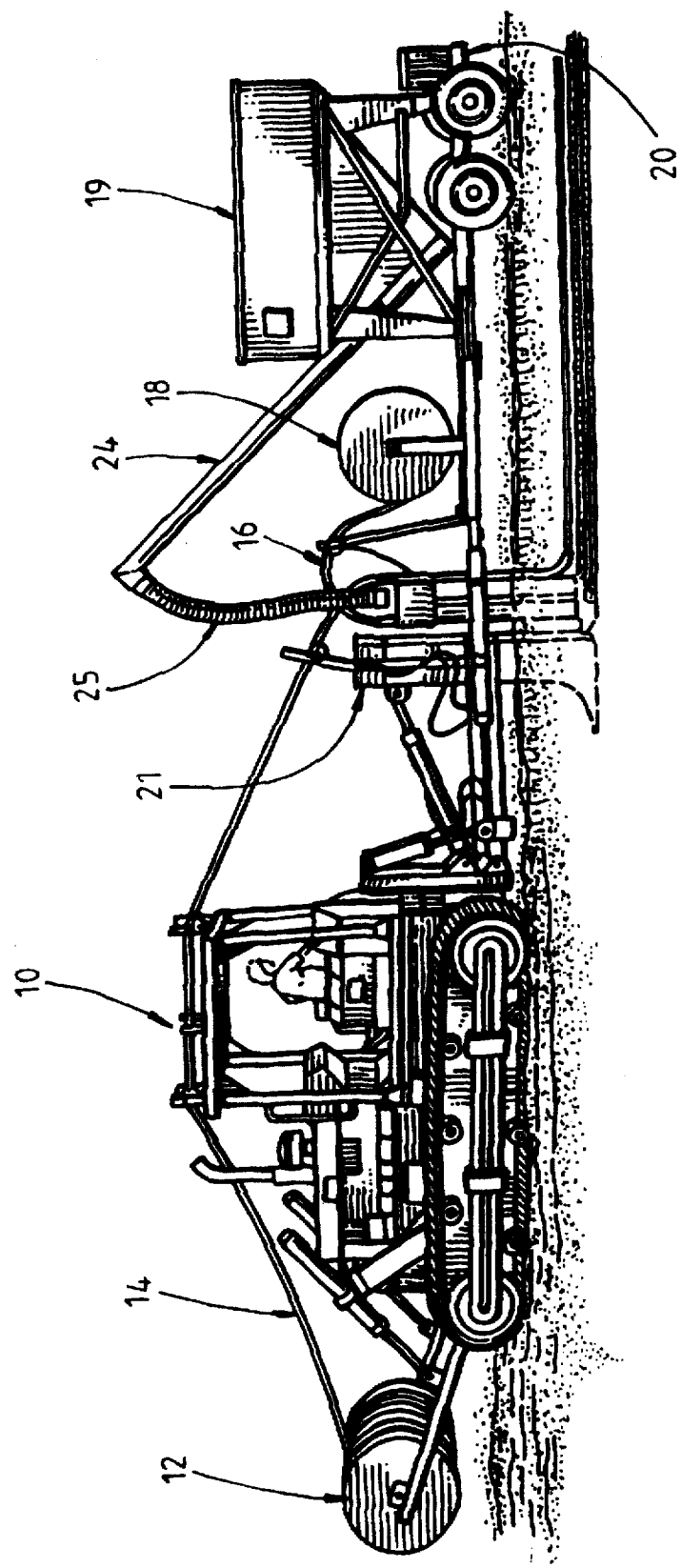
FIG. 1 is a perspective side view of a specific embodiment of the linear anode installment system.
Figure 6:
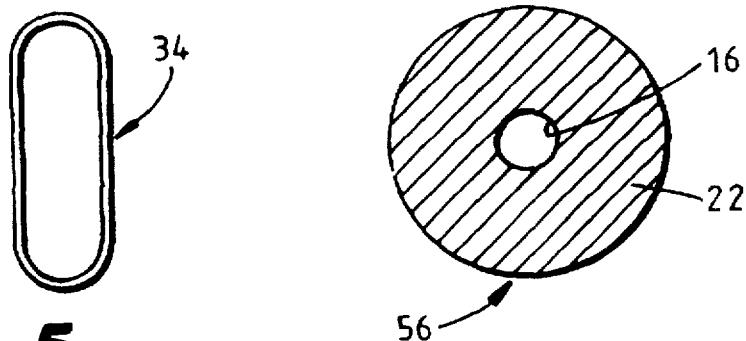
FIG. 6 is a cross sectional front view of the linear anode encased underground with a densely-packed coke breeze column.

In a specific embodiment, the invention may include an apparatus such as that shown in FIG. 1. The preferred apparatus comprises a plow for creating a tunnel and a chute with a non-metallic lining for delivering coke breeze to the tunnel to provide a densely-packed underground column of coke breeze encasing the linear anode. The apparatus may also have an anode conduit for delivering a linear anode to the tunnel. Advantageously, the chute may be disposed around the anode conduit in the manner shown in FIGS. 2 and 3 to deliver the coke breeze into the tunnel and to form the densely-packed column as shown in FIG. 6.

Figure 4:
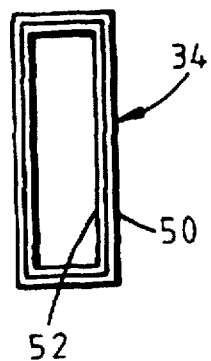
FIG. 4 is a cross sectional top view of the chute in FIG. 3.

In another aspect, the anode cable installment system includes a subassembly for delivering coke breeze particles to a tunnel. The subassembly includes a chute with a non-metallic inner surface, preferably an epoxy film lining. The system delivers the coke breeze particles to the tunnel created by the plow, preferably to provide a substantially horizontal, densely-packed column encasing a buried linear anode. The chute may have a rectangular cross section as in FIG. 4, an elliptical cross section as in FIG. 5, or a circular cross section as in FIG. 7. Additionally, while the chute may comprise two different materials such as a metal (preferably steel) and a non-metallic inner surface (preferably epoxy), as shown in FIG. 4, it may also comprise a single material such as fiberglass having a smooth inner surface with a lower coefficient of friction than steel, such as the chute shown in FIG. 5.

Pursuant to the invention, the linear anode is installed underground, preferably by creating a horizontal tunnel, which is a ground opening or borehole dimensioned to receive the linear anode and coke breeze column, followed by delivering the anode to the tunnel. While it is possible to bury the anode by digging a trench, placing the anode in the trench, then filling up the trench over the anode with earth or gravel, the anode is preferably delivered to the ground by digging a tunnel, more preferably the tunnel shown in FIG. 2, and still more preferably a tunnel created by the plow system shown in FIGS. 1 and 2.

Figure 2:
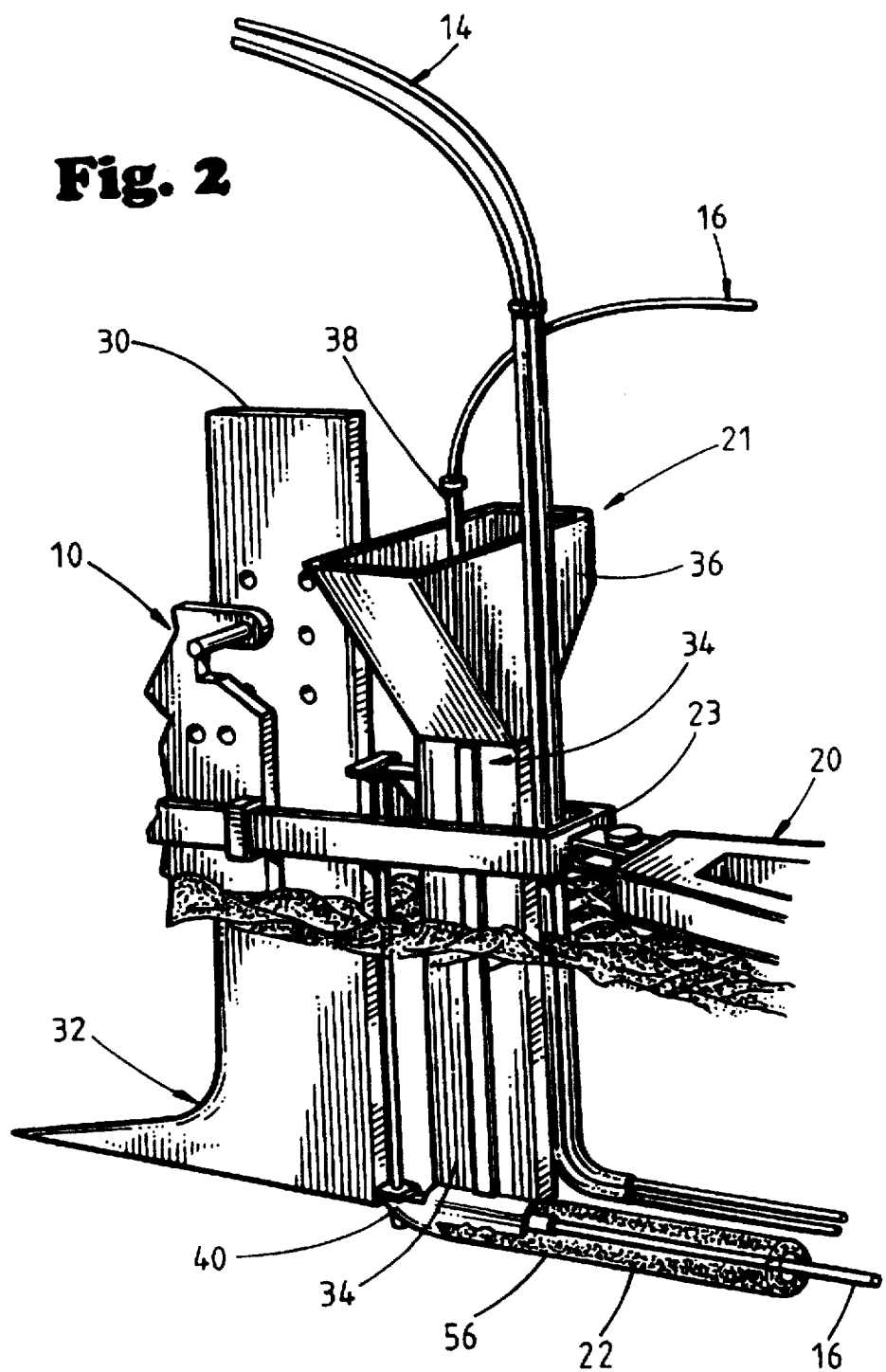
FIG. 2 is a cutaway perspective rear view of a specific embodiment of a linear anode installment subassembly.

As shown in FIGS. 1-4, in a specific embodiment the chute has a cross section sufficient to receive the anode conduit and the coke breeze particles in the annular space between the outer wall of the anode conduit and the inner wall of the chute. The chute should be positioned to direct the coke breeze particles downward to the tunnel, preferably being disposed in a substantially vertical position with respect to the tunnel as shown in FIGS. 1 and 2, but optionally being disposed at an angle with respect to the tunnel.

The system in FIG. 1 includes a plow tractor 10, which may be any vehicle capable of supporting the installment system. The vehicle should be capable of creating a tunnel or otherwise forming a horizontal ground opening dimensioned to receive the linear anode and coke breeze. The tractor 10 may include a large spool 12 around which are coiled header cables 14 that may be buried alongside the anode cable 16, which may be coiled around a second large spool 18, affixed to trailer 20. A coke breeze hopper 19 may be mounted to the system to hold the granular coke breeze and is preferably attached to the trailer 20. From the hopper 19, coke breeze can be delivered through the delivery conduit 24 and flexible tubing 25. Alternatively, other configurations may be employed to deliver the coke breeze to the chute and into the tunnel, particularly when the anode delivered to the tunnel is an encased linear anode.

Referring to FIG. 2, cable installment device 21 is preferably positioned between the tractor 10 and the trailer 20. That device may comprise a frame or supporting bracket 23 and cable plow 30 with a plow spear or blade 32 to create the tunnel. The cable installment device also may include the chute 34 which preferably includes a chute hopper 36 but which may instead comprise a funnel or other wide-mouth opening associated with chute 34. The chute preferably extends downward along and next to the plow 30 approximately to the depth of the tunnel and may include a bullet outlet 40. As shown in FIG. 2, the upper half of the bullet outlet should be cylindrical while the lower back half may be open to the surrounding earth. The bullet outlet 40 preferably has an enclosed cup or pocket in the space between the rear end of the plow spear 32 and the front end of the chute 34. When the plow is being operated, the bullet outlet 40 provides sufficient room in the tunnel created by the plow spear 32 for the coke breeze to form a column or encasing around the anode cable 16 as it exits the bottom of the chute 34 and enters the tunnel.

Figure 3:
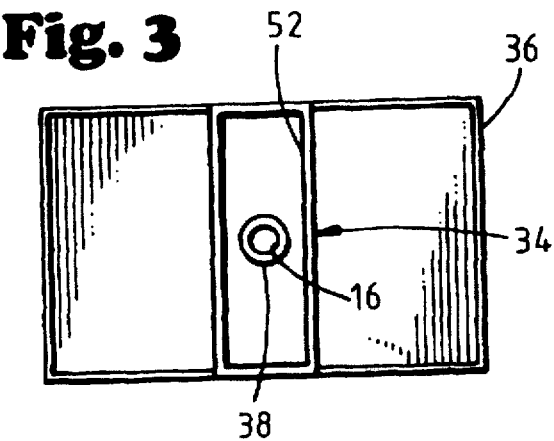
FIG. 3 is a sectional top view of the chute hopper, chute and anode conduit of the system depicted in FIG. 2.
Figure 5:
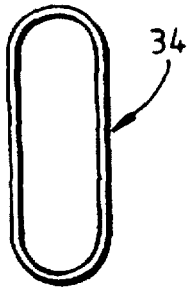
FIG. 5 is a cross sectional top view of an alternative embodiment of the chute.
Figure 7:
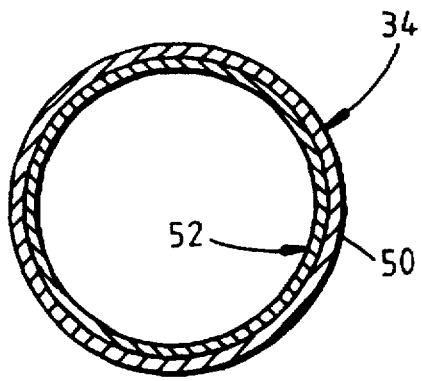
FIG. 7 is a cross sectional top view of a specific embodiment of the chute, configured to receive an encased cable anode.

Referring to FIG. 3, the chute 34 preferably includes a chute hopper 36 to receive coke breeze from the flexible tubing 25, as shown in FIG. 1. As discussed above, the chute 34 is preferably positioned behind the plow spear 32 and has substantially the same width as the plow spear 32 so that it may enter the ground opening created by the plow spear. The chute 34 is shown with a rectangular cross section in FIGS. 1-4. However, as shown in FIG. 7, the chute may also be cylindrical. Alternatively, the chute may have an elliptical or oval cross section, as depicted in FIG. 5, particularly on the front end, to lower resistance against the earth that is moved aside by the plow spear when the plow is being operated.

As shown in FIG. 2, the linear anode 16 may be inserted into chute 34, preferably through an anode conduit 38 which may be directed through the chute 34. The term "linear anode" as used herein refers broadly to any type of tubular or linear anode structure, particularly anodes used for continuous cathodic protection of underground structures such as cable anodes, ribbon anodes, or tubular anodes. The linear anode preferably is approximately ½ inch in diameter. A variety of linear anode materials may be used, including but not limited to copper, zinc, magnesium, or aluminum, or blends or alloys that include those materials. A preferred linear anode is AnodeFlex®, available from Raychem Corporation and said to be made of a copper conductive wire coated with a flexible conductive polymer material.

Referring to FIG. 3, the linear anode is preferably inserted into the chute 34 through an anode conduit 38, which is preferably made of a durable material such as steel. If anode conduit 38 is included in the system, it should extend from the chute hopper 36 down to the bottom edge of the chute 34 proximate the bullet outlet 40.

Referring to FIGS. 3, 4, and 7, the chute preferably comprises at least two materials, the body of the chute being a durable material such as steel, the chute having a non-metallic inner surface such as an epoxy film layer. In accordance with this invention, it is important to reduce the friction between the inner wall of the chute and the coke breeze granules passing through the chute and contacting the inner surface of the chute. It is contemplated that epoxy advantageously reduces the friction that would otherwise be generated between the coke breeze particles and the inner wall of the chute. Although other materials may be used for the chute body, carbonized steel is preferred since it is able to withstand the forces and stresses exerted on it during plowing and anode installation. Referring to FIG. 5, the chute may also be made of a single non-metallic material having an inner surface whose coefficient of friction is less than that of steel. For example, the chute may be constructed of a durable impact resistant plastic composite or fiberglass.

FIG. 4 has been drawn out of scale to highlight a preferred aspect of the invention. There, chute 34 includes a chute body 50 made of carbon steel and an epoxy film layer covering the inner surface 52. The epoxy film may be affixed to the inner wall of the chute 34 in a variety of ways. Preferably, the epoxy film is affixed by sandblasting the inside of the steel chute to provide sufficient anchor pattern for the epoxy to adhere to the wall surface. The chute may then be dipped in phosphoric acid followed by dipping in epoxy, which adheres to the inside wall of the chute. Of course, the invention is in no way limited to how the epoxy or other non-metallic surface is applied or otherwise affixed to the inner portion of the chute. Further, although the non-metallic lining should be attached in some way to the inside of the chute, it need not be permanently affixed. For example, the nonmetallic liner may comprise a premolded fiberglass liner which is inserted inside the chute and which can be removed periodically. Moreover, the chute inner surface may be only partially non-metallic, but still have a sufficient portion that is non-metallic to reduce friction inside the chute.

Although the nonmetallic surface is preferably an epoxy film, the present invention is not limited to any particular material. Thus, the inner surface may include ceramic, porcelain, elastomer, enamel, lacquer, urethane, fiberglass, plastic composites, or plastic resins such as polyethylene, polypropylene or polyvinylchoride (PVC). However, the inner surface should be as durable as possible to withstand the constant contact with and abrasion caused by the granular coke breeze.

In accordance with the invention, the nonmetallic surface preferably reduces friction between the cathodic particles and the inside wall of the chute. The cathodic material preferably comprises granular carbon such as coke breeze, which is a carbon byproduct of processes such as coking operations or carbonization of bituminous coal. However, the invention is not necessarily limited to coke breeze. Other cathodic materials used to encase the linear anode which discharge current from the linear anode may also be used with the invention.

In a preferred aspect, the method of the invention includes the steps of plowing ground to a preselected depth to provide a tunnel; delivering coke breeze to the tunnel to provide an encasement or column for the linear anode, said delivery being made by passing the coke breeze over a smooth non-metallic surface, preferably a chute inner liner which preferably comprises a thin epoxy film layer.

FIG. 6 is a front-view cross section of a continuous linear anode 16 encased in a column 56 of coke breeze 22, which may also be seen in FIGS. 1 and 2. In a preferred aspect, by increasing the flow rate of coke breeze 22 delivered through the chute 34, the density of the coke breeze 22 may be increased or maintained in the column 56 that encases the buried linear anode 16. It is contemplated that, if the flow rate of the coke breeze is too low, the coke breeze encasement 56 around the anode 16 may have voids or air pockets, which may reduce the effectiveness and life of the anode/ coke breeze column. The continuous linear anode may include more than one cable section, each attached end-to-end so as to provide a continuous current throughout the series of attached cables.

FIG. 7 shows a specific embodiment of the invention which includes a chute that can advantageously be used to install an encased anode, which is a linear anode already encased in a coke breeze column prior to underground installation. An example of such an encased cable anode is AnodeFlex® 1500, available from Raychem Corporation, which has an outer covering, such as a nylon "sock" or tube, to contain the densely-packed coke breeze column. The anode installation system of this invention may thus include a single chute for delivering both a continuous linear anode and coke breeze particles simultaneously. Unlike the linear anode shown in FIGS. 1–2, the coke breeze particles in the encased linear anode are already compacted and configured in the form of a column encasing the linear anode. The chute 34 comprises a steel conduit 50 and an inner liner 52, which is preferably a thin epoxy film. The chute in FIG. 7 is deliberately drawn out of scale for illustrative purposes. The inner liner 52 should be only a fraction of the thickness of the steel conduit 50. Unlike the chute 34 shown in FIGS. 1–4, the chute in FIG. 7 is cylindrical, although other geometrical configurations are also within the scope of the invention. The inner diameter of the chute 34 should be slightly larger than the outer diameter of the encased linear anode (not shown), which occupies the inside of the chute 34. For example, where the encased linear anode has a diameter of 2 inches, the inner diameter of the chute should be approximately 2 and ½ inches. Encased linear anodes generally have diameters ranging from about ¾ inch to about 2 and ½ inches. More typically, encased cable anodes have cross sections of from about 1 and ½ inches to about 2 inches.

The smooth, non-metallic inner surface of the chute in FIG. 7 is designed to protect against tearing of the encased anode outer covering, which may comprise a thin sheet of nylon. When installing an encased linear anode, it is important to avoid tearing, since a tear can result in loss of coke breeze after underground installation, resulting in a less effective anode system. The danger of tearing increases when the encased anode is installed at high speeds. Thus, the present invention is even more desirable at high installation speeds.

In general, it is contemplated that the present invention offers a number of advantages over other linear anode installation systems. For example, by delivering the coke breeze at a high rate, the invention may increase the compaction and density of the coke breeze column that encompasses the linear anode. The invention may also increase the rate at which the coke breeze and linear anode are delivered to the tunnel, which tends to reduce labor costs, particularly for continuous linear anodes that are miles in length and in particular for those that are buried over six feet below ground.

While this invention has been described with reference to certain specific embodiments and configurations, upon reading this patent, a person skilled in the art will recognize many variations without departing from the overall invention. For example, although the chute is preferably disposed around an anode conduit to provide an annular space for delivering the coke breeze, the chute may also be disposed next to the anode conduit. Also, a system may be utilized which does not have an anode conduit in the chute, but may instead have brackets (not shown) to guide the linear anode through the chute to the tunnel. Alternatively, a system may deliver the linear anode directly to the tunnel through the bed of coke breeze without guides or brackets. The anode conduit may have a non-metallic outer surface to reduce friction with the coke breeze. Other changes that would be apparent to persons skilled in the art, involving structural changes to the various components of the system, are also within the scope of the invention. The invention described by the claims is thus intended to cover all such changes, modifications and additions to this invention which provide similar advantages and benefits but do not depart from the overall scope and spirit of the invention.

What is claimed is:

1. An apparatus for underground installation of a linear anode, comprising:

a plow for providing a substantially horizontal tunnel to receive the linear anode; and a chute for delivering a granular cathodic material to the tunnel around the linear anode, said chute having a non-metallic inner surface and being dimensioned to receive the linear anode and granular cathodic material simultaneously, said linear anode being encased in a column of said cathodic material, said column being cylindrical and having an outer covering for holding the cathodic material in place around said inner anode.

2. The apparatus of claim 1 additionally comprising an anode conduit for delivering the linear anode to the tunnel, said anode conduit having a diameter sufficient to receive the linear anode and a length sufficient to deliver the linear anode to the tunnel.

3. The apparatus of claim 2 in which the anode conduit has an outer wall and is disposed within the chute to provide an annular space between the anode conduit and the non-metallic inner surface of the chute.

4. The apparatus of claim 1 in which the granular cathodic material comprises coke breeze.

5. The apparatus of claim 1 in which the outer covering comprises nylon.

6. The apparatus of claim 1 in which the chute comprises a steel conduit and a layer of non-metallic material affixed to the inside wall of the chute.

7. The apparatus of claim 1 in which the non-metallic material comprises epoxy.

8. The apparatus of claim 1 in which the chute is configured to deliver the coke breeze simultaneously with delivery of the linear anode.

9. The apparatus of claim 1 in which the plow includes a plow blade which extends to the depth of the tunnel and wherein the chute is contiguous with the plow blade and has a first end above the ground for receiving the cathodic material and a second end beneath the ground for delivering the cathodic material to the tunnel.

10. An apparatus for installing coke breeze particles in a tunnel to form a substantially horizontal densely packed column encasing a buried linear anode, said apparatus comprising a chute for delivering the coke breeze particles to the tunnel, said chute having a diameter sufficient to receive the coke breeze particles and positioned to direct the coke breeze particles to the tunnel; having an outer wall and an inner wall, said inner wall having a non-metallic surface; and being dimensioned to receive the linear anode and granular cathodic material simultaneously.

11. The apparatus of claim 10 in which the non-metallic surface comprises a thin film lining.

12. The apparatus of claim 10 wherein the chute is made of metal and the inner wall of said chute comprises a thin non-metallic film lining.

13. A method of installing a continuous linear anode proximate an underground structure to reduce corrosion of said structure, said method comprising the steps of:

plowing the ground to provide a substantially horizontal tunnel to receive the linear anode;

delivering the linear anode to the tunnel;

delivering coke breeze particles through a chute over a non-metallic surface of said chute, said chute being dimensioned to receive the linear anode and granular cathodic material simultaneously;

delivering said coke breeze particles to the tunnel to form a column around the linear anode.

14. An apparatus for underground installation of a linear anode, comprising:

a plow for providing a substantially horizontal tunnel to receive the linear anode;

an anode conduit for delivering the linear anode to the tunnel, said anode conduit having a diameter sufficient to receive the linear anode and a length sufficient to deliver the linear anode to the tunnel;

a chute for delivering a granular cathodic material around the linear anode to the tunnel, said chute having a non-metallic inner surface and being dimensioned to receive the linear anode and granular cathodic material simultaneously.

15. The apparatus of claim 14 wherein the chute is made of metal and has a layer of epoxy affixed to the inner surface.

16. The apparatus of claim 14 wherein the plow includes a plow blade of length sufficient to provide a tunnel more than three feet beneath the ground surface.

17. An apparatus for installing an encased linear anode, said linear anode comprising a linear anode encased in a column of densely packed granular cathodic particles and a covering around said column to contain said encased linear anode, said apparatus comprising a first member for creating a substantially horizontal tunnel to receive said encased linear anode and a second member for delivering said encased linear anode to said tunnel, said second member (a) being configured to have a first end above the surface of the ground and a second end below the surface of the ground when said apparatus is in operation, (b) having an opening extending from said first end to said second end, comprising an inner non-metallic surface for guiding said encased linear anode to said tunnel, and (c) being dimensioned to receive the linear anode and granular cathodic material simultaneously.

* * * * *